(12) United States Patent
Saboori et al.

(10) Patent No.: US 9,553,732 B2
(45) Date of Patent: Jan. 24, 2017

(54) CERTIFICATE EVALUATION FOR CERTIFICATE AUTHORITY REPUTATION ADVISING

(71) Applicant: Microsoft Corporation, Redmond, WA (US)

(72) Inventors: Anooshiravan Saboori, Seattle, WA (US); Muhammad Umar Janjua, Bellevue, WA (US); Nelly Porter, Kirkland, WA (US); Philip Hallin, Port Townsend, WA (US); Haitao Li, Sammamish, WA (US); Xiaohong Su, Sammamish, WA (US); Kelvin Yiu, Bellevue, WA (US); Anthony Paul Penta, Bellevue, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 14/449,716

(22) Filed: Aug. 1, 2014

(65) Prior Publication Data

US 2014/0359281 A1 Dec. 4, 2014

Related U.S. Application Data

(63) Continuation of application No. 14/020,491, filed on Sep. 6, 2013.
(Continued)

(51) Int. Cl.
*H04L 29/06* (2006.01)
*H04L 9/32* (2006.01)

(52) U.S. Cl.
CPC .............. *H04L 9/3268* (2013.01); *H04L 9/321* (2013.01); *H04L 9/3263* (2013.01); *H04L 9/3265* (2013.01); *H04L 63/0823* (2013.01)

(58) Field of Classification Search
CPC ...... H04L 9/3263; H04L 9/3265; H04L 9/3268
See application file for complete search history.

(56) References Cited

U.S. PATENT DOCUMENTS 6,148,083 A 11/2000 Fieres et al.
7,058,619 B2 6/2006 Wanish
(Continued)

OTHER PUBLICATIONS

"What Are CA Certificates?", Published on: Jul. 26, 2011, pp. 10 Available at: http://technet.microsoft.com/en-us/library/cc778623(v=ws.10).aspx.
(Continued)

*Primary Examiner* — Edward Zee
(74) *Attorney, Agent, or Firm* — Timothy Churna; Judy Yee; Sandip Minhas

(57) ABSTRACT

In many information security scenarios, a certificate issued by a certificate authority on behalf of a domain is presented to a client in order to verify the identity of the domain. However, due to a decentralized structure and incomplete coordination among certificate authorities, the presence and exploitation of security vulnerabilities to issue untrustworthy certificates may be difficult for an individual client to determine. Presented herein are techniques for advising clients of the trustworthiness of respective certificate authorities by evaluating the certificates issued by such certificate authorities for suspicious indicators, such as hash-code collisions with other certificates and public key re-use. A trust level may be identified of respective certificate authorities according to the presence or absence of suspicious indicators in the certificates issued by the certificate authority, and a certificate authority trust set may be distributed to advise clients of the trustworthiness of certificates issued by the respective certificate authorities.

20 Claims, 8 Drawing Sheets

Related U.S. Application Data

(60) Provisional application No. 61/830,121, filed on Jun. 2, 2013.

(56) References Cited

U.S. PATENT DOCUMENTS

| | | | |
|---|---|---|---|
| 8,214,634 | B1 | 7/2012 | Steele et al. |
| 8,327,128 | B1 | 12/2012 | Prince et al. |
| 8,341,399 | B2 | 12/2012 | Brown et al. |
| D702,253 | S | 4/2014 | Kotler et al. |
| 9,077,546 | B1* | 7/2015 | Rakshit .................. H04L 9/3265 |
| 2002/0078347 | A1* | 6/2002 | Hericourt et al. ............ 713/156 |
| 2003/0018585 | A1 | 1/2003 | Butler et al. |
| 2003/0182549 | A1* | 9/2003 | Hallin ..................... G06F 21/33 713/156 |
| 2005/0080899 | A1 | 4/2005 | Vogel et al. |
| 2006/0015729 | A1* | 1/2006 | Novack et al. ............... 713/173 |
| 2008/0028443 | A1 | 1/2008 | Adelman et al. |
| 2008/0232583 | A1 | 9/2008 | DiCrescenzo et al. |
| 2012/0216035 | A1 | 8/2012 | Leggette et al. |
| 2012/0284508 | A1 | 11/2012 | Zaverucha |
| 2013/0014020 | A1 | 1/2013 | Dixon et al. |
| 2013/0061281 | A1* | 3/2013 | Pao et al. .......................... 726/1 |
| 2014/0237091 | A1 | 8/2014 | Sabin et al. |

OTHER PUBLICATIONS

Laurie, et al., "Certificate Transparency", In Network Working Group, Internet-Draft, Apr. 18, 2013, 34 pages, http://tools.ietf.org/pdf/draft-laurie-pki-sunlight-12.pdf.

"ImperialViolet", Published on: May 4, 2011, pp. 2 Available at: http://www.imperialviolet.org/2011/05/04/pinning.html.

"Certificate Patrol ", Retrieved on: May 16, 2013, pp. 9 Available at: http://patrol.psyced.org/.

Soghoian, et al., "Certified Lies: Detecting and Defeating Government Interception Attacks Against SSL", In Proceedings of the 15th International Conference on Financial Cryptography and Data Security, Feb. 28, 2011, 20 pages, http://files.cloudprivacy.net/ssl-mitm.pdf.

Pre-Interview Office Action cited in U.S. Appl. No. 14/020,491 dated Feb. 6, 2015, 7 pgs.

Reply Pre-Interview Office Action cited in U.S. Appl. No. 14/020,491 dated Apr. 6, 2015, 13 pgs.

Int. Search Report cited in PCT Application No. PCT/US2013/061082 dated Jan. 20, 2014, 11 pgs.

"A Formal Model of Trust for Calculating the Quality of X.509 Certificate", Wazan Ahmad Samer, Laborde Romain, Barrere Francois and Benzekri Abdel Malek, May 5, 2010, Security and Communication Networks, vol. 4, Issue 6, 57 pgs.

"Use of a Validation Authority to Provide Risk Management for the PKI Relying Party", 2006, Jon Olnes and Leif Buene, Public Key Infrastructure, Lecture Notes in Computer Science, vol. 4043, 15 pgs.

Final Office Action cited in U.S. Appl. No. 14/020,491 dated Apr. 30, 2015, 23 pgs.

Reply Final Office Action cited in U.S. Appl. No. 14/020,491 dated Oct. 30, 2015, 21 pgs.

Non-Final Office Action cited in U.S. Appl. No. 14/020,491 dated Nov. 27, 2015, 31 pgs.

Non-Final Office Action cited in U.S. Appl. No. 14/449,684 dated Sep. 10, 2015, 40 pgs.

Reply Non-Final Office Action cited in U.S. Appl. No. 14/449,684 dated Nov. 25, 2015, 18 pgs.

* cited by examiner

CERTIFICATE EVALUATION FOR CERTIFICATE AUTHORITY REPUTATION ADVISING

CROSS-REFERENCE TO RELATED APPLICATIONS

The present application claims priority to U.S. patent application Ser. No. 14/020,491, filed Sep. 6, 2013, which in turn claims priority to U.S. Patent Application No. 61/830, 121, filed Jun. 2, 2013, the entirety of which are hereby incorporated by reference.

BACKGROUND

Within the field of computing, many scenarios involve authentication using a certificate issued by a certificate authority. For example, a user may connect to a website to perform a sensitive interaction, such as a financial transaction, using credentials that might be misused if intercepted by a third party. Accordingly, the website may submit a certificate verifying its identity and signed by a certificate authority. The device of the user may examine the cryptographic signatures of the certificate to verify its authenticity that the identity of the issuer and the authenticity of the certificate before proceeding with the transaction and the provision of credentials.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The certificate authority system is subject to exploitation due to a variety of technical and non-technical aspects. As a first example, vulnerabilities may be discovered and exploited in the mathematical models on which security techniques are based; e.g., flaws in the MD5 hashing algorithm may permit the forgery of certificates or the alteration of signed content. As a second example, under the current certification model, a set of certificate authorities is identified and globally trusted, such that any certificate authority may issue certificates for any domain; as a result, the exploitation, coercion, or malicious actions of any one certificate authority may result in the issuance of inauthentic certificates for any domain. As a third example, it may be difficult to detect exploits of certificate authorities, particular certificates, and the security models involved therein, because relevant information may be withheld (e.g., certificate authorities often do not provide public records of issued certificates and/or currently utilized security techniques), and/or may be unable to assess outside of a collective process that currently does not exist (e.g., some types of exploits may be apparent from a collection of certificates submitted to a variety of users, but may be undetectable from individual certificates).

In view of these limitations, the present disclosure involves a model for evaluating certificates issued by certificate authorities for respective domains. In accordance with this model, a certificate authority trust service may collect a set of certificates that have been issued by certificate authorities for respective domains. The certificate authority trust service may evaluate the certificates to detect a suspicious indicator that the certificate does not legitimately reflect a certification of the domain by the certificate authority. The suspicious indicators may include, e.g., a hashcode collision between the certificate and a second certificate; the issuance of a certificate for a domain within a first region that has an official certificate authority, where the certificate is issued by a second domain from a second region; or the issuance of a certificate at a first time that uses a first security technique presenting a known vulnerability, while a previous certificate was issued by the certificate authority for the domain at a previous time that used a second security technique that presented no known vulnerability, which may indicate an unexplained relaxation of security standards.

The certificate may be evaluated to detect any of several such suspicious indicators. The presence of a suspicious indicator in a certificate may suggest the certificate authority is issuing certificates that it is not entitled to issue, and/or that the domain or a third party is able to exploit a security vulnerability of the certificate authority. Such suspicious indicators may therefore entail a reduction of the certificate authority trust level of the certificate authority, while the absence of suspicious indicators in certificates, particularly for a continuing set of certificates that are issued for domains by the certificate authority, may result in promotion of the trust level of the certificate authority over time. The certificate authority trust service may generate a certificate authority trust set that indicates the certificate authority trust levels of the respective certificate authorities, and may distribute the certificate authority trust set to clients, which may in turn decide whether or not to trust a particular certificate based upon the certificate authority trust level of the certificate authority that issued the certificate. In this manner, the techniques presented herein may enable the devices to evaluate the trust of certificates using collective information in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
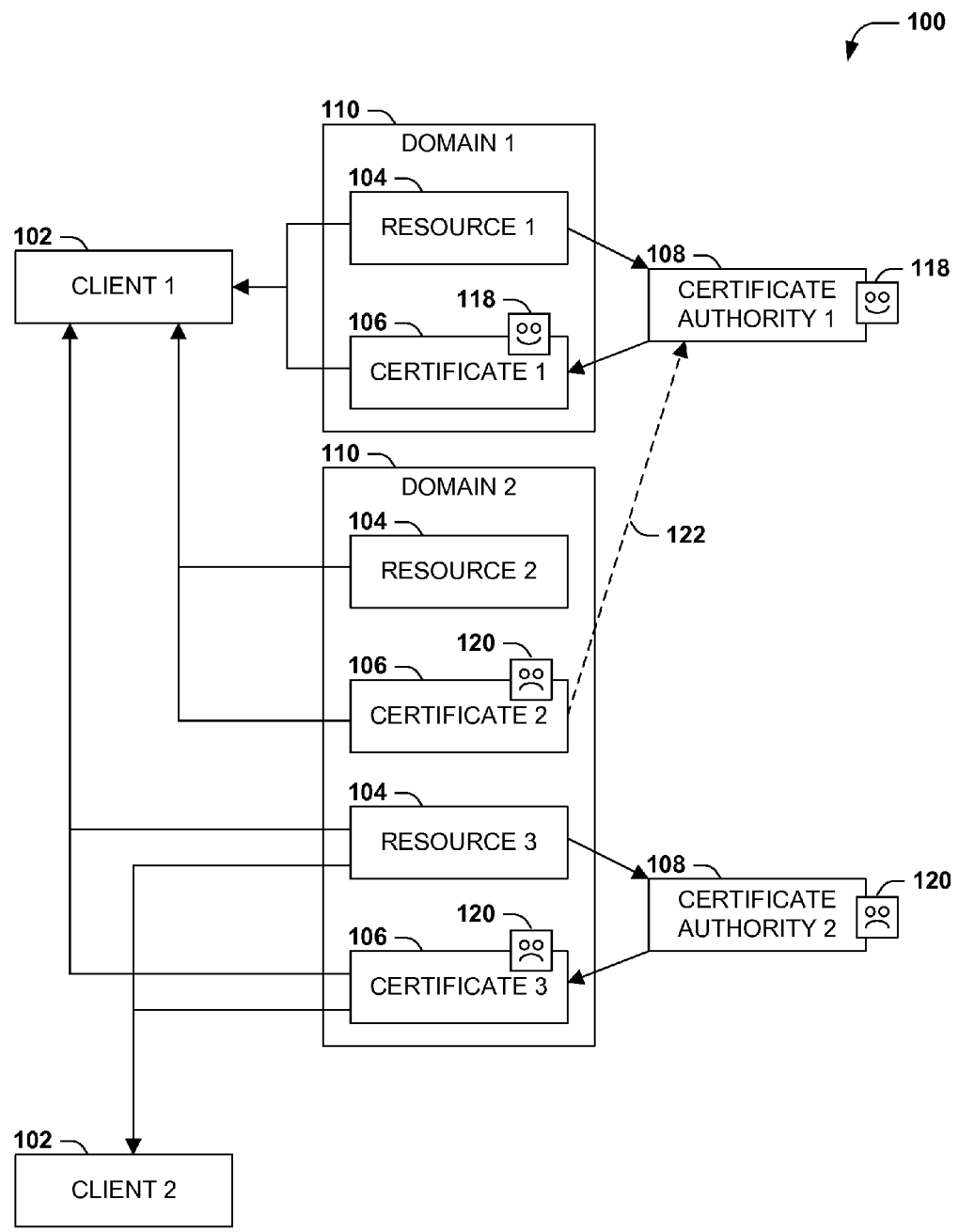
FIG. 1 is an illustration of an example scenario featuring a set of certificate authorities issuing certificates for certificated items to clients.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring a set of certificate authorities 108 issuing certificates 106 to various clients 102. In this example scenario 100, a first client 102 may communicating over a network (a cellular network or the Internet) may request a resource 104 from a first domain 110 of the network, such as retrieving mail from a trusted mail server. The first client 102 may endeavor to verify the authenticity of the domain 110 (e.g., that the domain 110 communicating with the first client 102 is actually the trusted mail server, and not a third party impersonating the trusted mail server, such as in a "man-in-the-middle" attack).

In order to facilitate the first client 102 in verifying the authenticity of the domain 110, a first certificate authority 108 may be provided that has established a level of trust with the first client 102. The first certificate authority 108 may generate a first certificate 106 identifying one or more aspects of the identity of the first domain 110 and/or the resource 104 (e.g., a hashcode of the content of a message), and cryptographically signed with a credential of the first certificate authority 108 (e.g., using a cryptographic private key of an asymmetric encryption technique). The first certificate authority 108 may then provide the first certificate 106 to the first domain 110, which may, in turn, provide the first certificate 106 with the resource 104 requested by the first client 102. Upon receiving the certificate 106, the first client 102 may authenticate the first certificate 106 with a credential of the first certificate authority 108 (e.g., verifying the signature of the first certificate 106 with a cryptographic public key of the first certificate authority 108). Verification of the first certificate 106 with the credential of the first certificate authority 108 establishes a trustworthiness 118 of the first client 102 in the authenticity of the first certificate 106 (e.g., that the first certificate 106 was actually generated by the first certificate authority 108 and not a third party, and that the first certificate 106 has not been altered subsequent to generation). If the verification is successful, the first client 102 may interact with the domain 110 to complete the transaction involving the resource 104 (e.g., by providing a user's identification credentials, such as a login and password, in order to allow the domain 110 to authenticate the user). In this manner, the trustworthiness 118 of domains 110 may be established on behalf of clients 102 by certificate authorities 108, even if such certificates 106 are handled by untrusted intermediaries.

In view of these techniques, a body of certificate authorities 108 may be created according to a set of security practices. Occasionally, exploits in the body of certificate authorities 108 may prompt changes to the structure and underlying security techniques of such certificate authorities 108. For example, vulnerabilities may be occasionally discovered in some of the mathematical techniques used in certificate generation that enable an attacker to alter the contents of the certificates 106 issued by certificate authorities 108. For instance, the hashing algorithm identified as MD5 was regarded as applicable to a particular set of content with a cryptographic private key, resulting in a hashcode for a domain 110 that is verifiable with the corresponding cryptographic public key, that enables the detection of alterations to the signed content, and that cannot be generated without possessing the cryptographic private key corresponding to the cryptographic public key. However, flaws discovered in the mathematical techniques comprising the MD5 hashing algorithm may be exploited to allow the generation of certificates 106 without possession of the cryptographic private key, and/or the adjustment of a validly generated hashcode in a manner that verifies against altered content. While such exploits may be computationally very difficult, the feasibility of generating hashcodes for forged or altered certificates 106 has prompted a revocation of public trust in the MD5 hashing algorithm, and has prompted certificate authorities 108 to shift security practices in the generation of certificates 106 from using the MD5 hashing algorithm to other hashing algorithms (such as SHA-2) that are not currently known to present mathematical flaws or vulnerabilities.

However, difficulties in this technique may arise from a decentralized body of certificate authorities 108. For example, certificate authorities 108 may operate independently, and may not uniformly agree about the selection and implementation of security practices to be used in generating certificates 106. Accordingly, a first certificate authority 108 may use a security practice (such as a particular hashing algorithm) that a second certificate authority 108 considers unsecure. Additionally, incomplete disclosure by a particular certificate authority 108 of the security practices utilized in generating certificates 106 (e.g., policies for rotating certificating credentials) may cause difficulty in assessing the certificate authority trust level 212 of the certificate authority 108 according to the authenticity of its certificates 106. Accordingly, a lack of collective evaluation of trust in certificate authorities 108 may inhibit the evaluation of the certificate authority trust level 212. For example, a particular client 102 presented with a certificate 106 may have limited access to information as to the certificate authority trust level 212 to be ascribed to the certificate authority 108 in view of the certificate 106, and may therefore be unable to authenticate the certificate 106 beyond the content thereof. Additionally, diagnostic information pertaining to the certificate authority trust level 212 of certificate authorities 108 may be apparent in patterns of activity in the issuance of a variety certificates 106 by the certificate authority 108 to a variety of clients 102, but the evaluation of such information may be inhibited by the unavailability of mechanisms for collecting and evaluating the certificates 106 issued by the certificate authority 108 and received by a variety of clients 102.

Accordingly, the certificate authority trust level 212 to be placed in certificate authorities 108 may be subject to exploitation that may be difficult to detect. As a first such example, in some certificate authority scenarios, any certificate authority 108 may issue a public certificate for any domain 110. The certificate authority trust level 212 of the certificate authority system may thus be subject to exploitation; e.g., certificates 106 ostensibly representing a first entity (such as a first company or a first national government) may be issued by a certificate authority 108 that is collaborating with an adverse second entity (such as a competing company or a hostile second national government). As a second such example, because certificate authorities 108 may not provide public records of the certificates 106 issued on behalf of various domains 110, it may be difficult for a domain 110 to detect the issuance of unauthorized certificates on its behalf. As a third such example, it may be difficult to review the security practices utilized by a particular certificate authority 108; e.g., some certificate authorities 108 may be slow or reluctant to transition away from using security practice that is found to be unsecure. As a fourth such example, some types of exploits may be detectable only by a collective evaluation of many certificates; e.g., the issuance of certificates on behalf of a particular domain 110 concurrently by two or more different certificate authorities 108 may raise a security concern, but the detection of this condition may be difficult to discern from the examination of any particular certificate 106 in isolation. Moreover, due to the absence of a collective process to gather, examine, reach a consensus on, and disseminate information about the trust placed in respective certificate authorities makes it difficult for any particular client 102 to determine whether or not to determine the certificate authority trust level 212 of a particular certificate authority 108, and the authenticity of a certificate 106 issued by the certificate authority 108 for a particular domain 110.

Such problems are further illustrated in the example scenario 100 of FIG. 1. As a first such example, the first client 102 may receive from a second domain 110 a second certificate 106 indicating issuance by the first certificate authority 108. However, the second certificate 106 may not have actually been issued by the first certificate authority 108, but may instead have been forged 122 (e.g., by the second domain 110 or a third party) through the exploitation of a security vulnerability (e.g., the use of a compromised credential of the first certificate authority 108). Accordingly, it may be desirable for the client 102 to identify an untrustworthiness 120 of the second certificate 106, but the first client 102 may not be able to determine such untrustworthiness 120 simply by examining the second certificate 106. As a second example, a second certificate authority 108 that exhibits untrustworthiness 120 (e.g., a history of issuing improper certificates 106) may issue a third certificate 106 for a third domain 110, and the third certificate 106 may be submitted to the first client 102. However, even if the first client 102 is able to determine the untrustworthiness 120 of the third certificate 106 issued by the second certificate authority 108, such determination of untrustworthiness 120 may not be communicated to a second client 102, which, upon receiving the third certificate 106, may incorrectly determine a certificate authority trust level 212 of the second certificate authority 108. Due to these aspects illustrated in the example scenario 100 of FIG. 1 and other aspects of a system of certificate authorities 108, determinations of certificate authority trust level 212 of respective certificate authorities 108 may be difficult.

B. Presented Techniques

Presented herein are techniques that may enable a reduction or avoidance of exploitable vulnerabilities that may arise within a system of certificate authorities 108. In accordance with these techniques, a certificate authority trust service may be devised that collects certificates 106 that have been issued on behalf of various domains 110 and presented to clients 102. For example, the devices utilized by a set of users may automatically submit some received certificates 106 to a certificate authority trust service. Alternatively or additionally, a certificate authority trust service may utilize a set of trusted clients 102 (e.g., a trusted set of crawlers) that automatically explore a set of domains 110 and collect certificates 106 submitted by the domains 110 and apparently issued by a certificate authority 108. Based on the evaluation of the respective certificates 106, the certificate authority trust service 202 may generate a certificate authority trust set indicating a certificate authority trust level 212 for respective certificate authorities 108, and may distribute the certificate authority trust set to a set of clients 102. Each client 102 may then evaluate subsequently received certificates 106 based on the certificate authority trust level 212 of the certificate authority 108 issuing the certificate 106 as indicated by the certificate authority trust set, as well as various other heuristics for assessing the trust of a certificate 106. These and other techniques may be utilized to detect, disseminate, and utilize a collective certificate trust evaluation process in accordance with the techniques presented herein.

Figure 2:
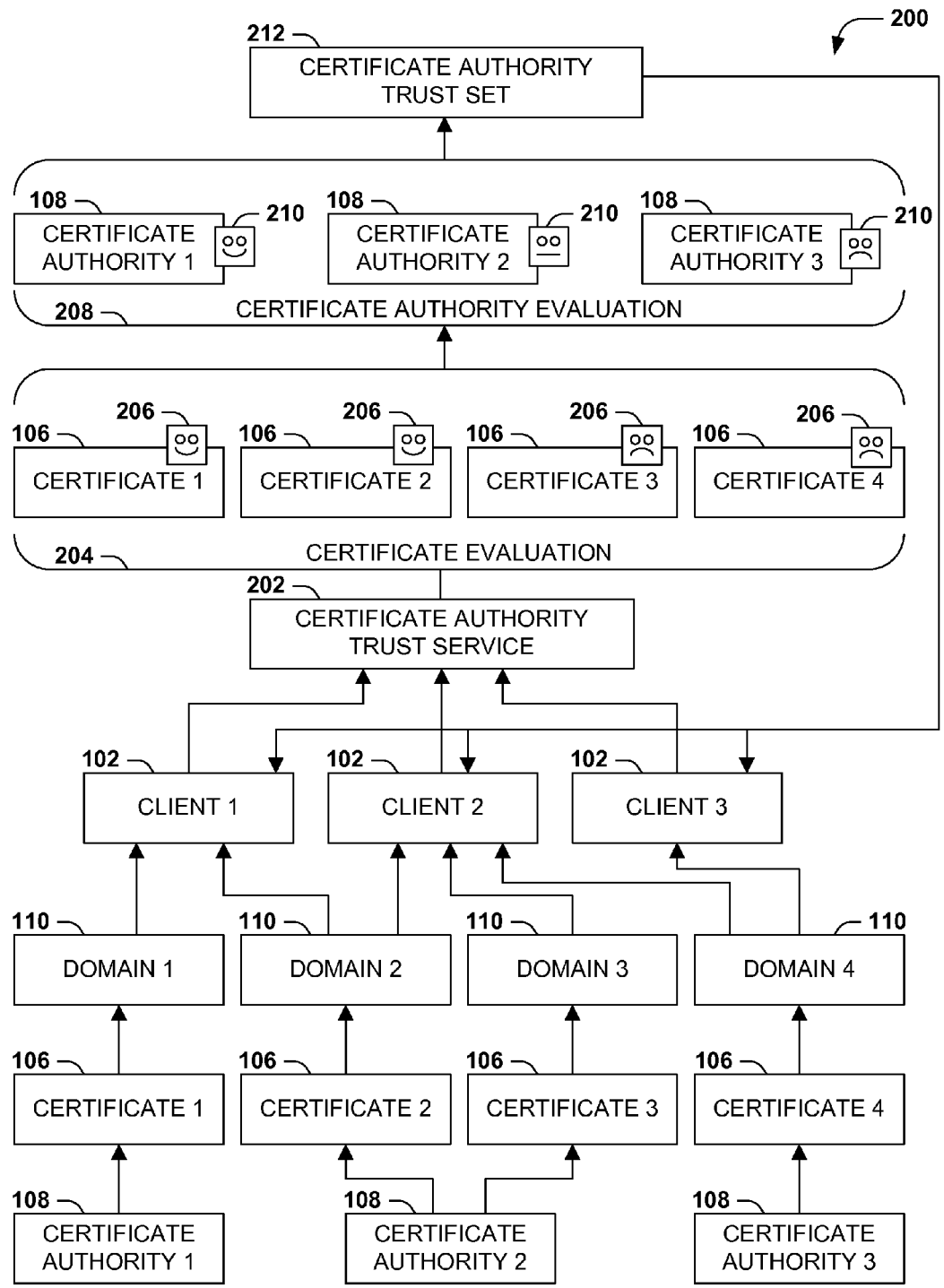
FIG. 2 is an illustration of an example scenario featuring a certificate authority trust service facilitating clients in evaluating certificates received from certificate authorities in accordance with the techniques presented herein.

FIG. 2 presents an illustration of an example scenario 200 featuring the collective evaluation of trust levels of various certificate authorities 108 by a certificate authority trust service 202. In this example scenario 200, a set of certificate authorities 108 issues a set of certificates 106 for various domains 110 (e.g., in order to certify the identity of the domain 110, and/or to certify that the domain 110 adheres to a business or security practice, as verified and certified by the certificate authority 108). The certificates 106 are presented to a set of clients 102 (e.g., directly by the certificate authorities 108, through another client 102, or indirectly by a domain 110 of a network). The clients 102 in turn send the certificates 106 (optionally including an identifier of the resource 104 and/or the domain 110 that resulted in the presentation of the certificate 106 to the client 102) to the certificate authority trust service 202.

The certificates 106 collected from various domains 110 may be evaluated to evaluate a certificate authority trust level 212 of the certificate authorities 108, using a variety of heuristics. As a first such example, the certificate authority trust service 202 may consider the number and pattern of times that the certificate 106 has been received from clients 102, e.g., whether the certificate 106 is new, established, or expired, and whether the certificate 106 has reappeared after a lapse in submissions by clients 102. As a second such example, the certificate authority trust service 202 may consider conflicts between the certificate 106 and other certificates 106 issued by the certificate authority 108 for a particular domain 110, such as a receipt of a second certificate 106 for a domain 110 while a prior certificate 106 for the same domain 110 remains in effect and unrevoked. As a third such example, a sequence of certificate authorities 108 back to a root certificate authority may be evaluated; e.g., if any of the certificate authorities 108 in the sequence by which a certificate 106 was issued has been compromised, the certificate 110 may be regarded as suspicious even if the other certificate authorities 108 have not been compromised. As a fourth such example, the content type of the domain 110 for which the certificate 106 has been issued; e.g., if the domain 110 is from a particular geographic region that is unusual for the certificate authority 108, or if the domain 110 hosts content that is unusual for the certificate authority 108 to certify (e.g., malware), the certificate 106 may be regarded as suspicious. As a fourth such example, if the certificate 106 was generated using a certification technique, such as an encryption or hashing algorithm, that has a known vulnerability and that may enable forgery or alteration, the certificate 106 may be regarded as suspicious.

The certificate authority trust service 202 also performs a certificate authority evaluation 208 of the respective certificate authorities 108 in order to detect the presence of a suspicious indicator 206 that the certificate 106 has not been legitimately issued by the certificate authority 108 to the domain 110. Such suspicious indicators 206 may result from a variety of problems. As a first such example, a certificate authority 108 may not be authorized to issue certificates 106 on behalf of a particular domain 110. As a second such example, a domain 110 may have forged or altered certificates to provide the appearance that a particular certificate authority 108 has issued a legitimate certificate 106 for the domain 110 (e.g., using a compromised security key of the certificate authority 108, or altering the contents of the certificate 106, such as the identifier of a certificate 106 that has been revoked by the certificate authority 108). As a third such example, a security vulnerability may have permitted a third party to compromise the certificate authority 108 and/or the domain 110 in order to alter the contents of the certificate 106. As a fourth such example, a third party may have intercepted the certificate 106 when transmitted from the certificate authority 108 to the domain 110, and/or from the domain 110 to a client 102.

In view of these and other sources of untrustworthiness, an examination of the certificate 106 may reveal a suspicious identifier 206 that reduces the trustworthiness of the certificate 106. A certificate authority trust service 202 may, upon receiving a certificate 106 from a client 102, perform a certificate evaluation 204 to detect the presence or absence of such a suspicious identifier 206 in the certificate 106. As a first such example, a certificate 106 may exhibit a hash collision, where the contents of the certificate 106 may have been intentionally altered such that a hashcode of the contents matches the hashcode of a second certificate 106. Such hash collisions may enable the re-use of the signature of a certificate authority 108 of the second certificate 106 as a signature of the first certificate 106 with altered contents, and may be detected by identifying that the hashcode of the first certificate 106 matches the hashcode of the second certificate 106. As a second such example, the certificate 106 purportedly issued by a first certificate authority 108 may be verifiable with a public key that is also usable to verify certificates 106 issued by a second certificate authority 108. Such public key re-use is unlikely to occur by coincidence, and may indicate either the alteration of the signature of the certificate 106 and/or the unauthorized dissemination and use of a private key corresponding to the public key. Public key re-use may also be detected by identifying a match between the public key usable to verify a first certificate 106 issued by the first certificate authority 108 and the public key usable to verify a second certificate 106 issued by the second certificate authority 108.

The certificate authority trust service 202 may perform the certificate evaluation 204 to detect the presence or absence of suspicious indicators 206 in the certificates 106 received from certificate authorities 108, and may accordingly establish a certificate authority trust level 210 for each certificate authority 108. For example, a first certificate authority 108 that has not issued any certificates 108 featuring a suspicious indicator 206 may be assigned a positive certificate authority trust level 210. A second certificate authority 108 issuing a small number of certificates 106 containing a ambiguous suspicious indicator 206 (which may indicate a passing coincidence, an anomalous practice utilized once by the certificate authority 108, and/or a temporary security problem that has been resolved by the certificate authority 108) may be assigned an intermediate certificate authority trust level 210. A third certificate authority 108 associated with several certificates 106 featuring unambiguous suspicious indicators 206, such as a chronic pattern of forged certificates 106, may be assigned a negative certificate authority trust level 210.

Having identified the certificate authority trust levels 210 of respective certificate authorities 108, the certificate authority trust service 202 generates a certificate authority trust set 212 identifying, for respective certificate authorities 108, a certificate authority trust level 210. The certificate authority trust service 202 sends the certificate authority trust set 212 to the clients 102, which may utilize the certificate authority trust set 212 to determine a certificate authority trust level 212 for the respective certificate authorities 108. Accordingly, upon receiving a certificate 106 for a domain 110, a client 102 may ascribe to the certificate 106 and the domain 110 a trust level proportional to a certificate authority trust level 212 of the certificate authority 108 apparently issuing the certificate 106. In this manner, the clients 102 and certificate authority trust service 202 may interoperate to achieve a collaborative collection, determination, and dissemination of certificate authority trust levels 212 of various certificate authorities 108 and certificates 106 issued thereby in accordance with the techniques presented herein.

C. Technical Effects

The techniques presented herein enable a variety of technical effects that may benefit the operation of devices configured according to such techniques.

As a first such example, a device utilizing the techniques presented herein may automatically advise other devices as to the reliability of certificates 106 and certificate authorities 108. The use of a device, such as a server, to achieve such detection may alleviate humans, such as security researchers, from manually reviewing such certificates 106 and making determinations of the certificate authority trust level 210 of respective certificate authorities 108. Additionally, using a device, such as a server, to perform such evaluation may promote the consistency of such determinations. AS a first such example, using a device that consistently applies a set of heuristics to a large number of certificates 106 enables more consistent security determinations than having a team of humans evaluate such certificates 106 individually and subjectively, and therefore possibly inconsistently, perform such evaluation.

As a second such example, a device utilizing the techniques presented herein may detect more subtle patterns among certificates 106, domains 110, and certificate authorities 108 than a human reviewer may detect and observe. As a first such example, an established certificate 106 may present no apparent signs of suspicion to a human reviewer, but an automated evaluation technique may detect that the certificate 106 has not been received from any clients 102 for an unusual amount of time (e.g., heavy use by the domain 106, a six-month period wherein no clients 102 submit the certificate 106 to the certificate authority trust service 202, followed by a sudden reappearance of the certificate 106). As a second such example, a certificate 106 by a certificate authority 108 may represent a minor problem that raises only a low degree of suspicion, but may be one of many such certificates 106 issued by the same certificate authority 108 that raise only a low degree of suspicion, where a detected pattern of consistently low suspicion may indicate an aggregate greater level of suspicion of the certificate authority 108.

As a third such example, a device utilizing the techniques presented herein may respond more rapidly to suspicious certificates and vulnerabilities than a human-mediated review process. For example, if a certificating authority begins issuing unambiguously forged certificates 106 on behalf of a collection of domains 110, an automated review technique may rapidly flag the certificate authority 108 as having been compromised and may rapidly notify a large body of clients 102 of a reduction of the certificate authority trust level 210 of the certificate authority 108, rather than waiting for a human to review the certificates and authorize the reduction of the certificate authority trust level 210. Such automated techniques therefore considerably reduce the window of opportunity for a compromised certificate authority 108 to exploit forged certificates 106. These and other technical effects are achievable through the use of the techniques presented herein.

D. Example Embodiments

Figure 3:
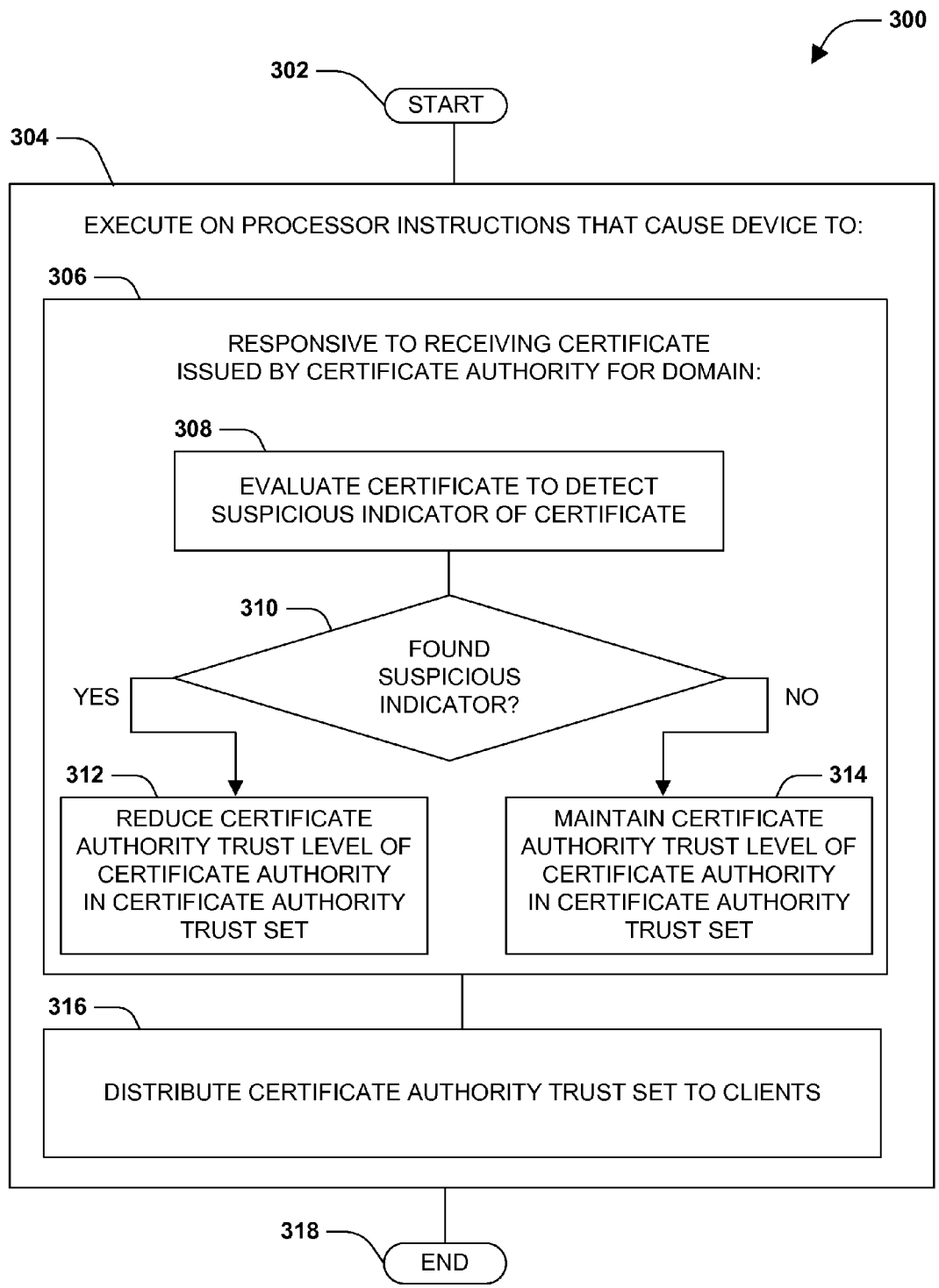
FIG. 3 is an illustration of an example method of advising clients of a certificate authority trust level of a certificate authority in accordance with the techniques presented herein.

FIG. 3 presents an illustration of an example first embodiment of the techniques presented herein, illustrated as an example method 300 of advising clients 102 of a certificate authority trust level 210 of a certificate authority 108. The example first method 300 may be implemented, e.g., as a set of instructions stored in a memory device (e.g., a memory circuit, a platter of a hard disk drive, a solid-state storage device, or a magnetic or optical disc) of a device having a processor (e.g., a server providing a certificate authority trust service 202 on behalf of a set of clients 102) and storing a certificate authority trust set 212, where the instructions, when executed on the processor, cause the device to operate according to the techniques presented herein.

The example first method 300 begins at 302 and involves executing 304 the instructions on the processor of the device. In particular, the execution of the instructions on the processor causes the device to, responsive 306 to receiving a certificate 106 issued by the certificate authority 108 for a domain 110, evaluate 308 the certificate 106 to detect a suspicious indicator 206 of the certificate 106. If the evaluation 310 results in the detection of a suspicious indicator 206 in the certificate 106, the instructions further cause the device to reduce 312 the certificate authority trust level 210 of the certificate authority 108 in the certificate authority trust set 212. On the other hand, if the evaluation 310 does not result in the detection of a suspicious indicator 206 in the certificate 106, the instructions further cause the device to maintain 314 the certificate authority trust level 210 of the certificate authority 108 in the certificate authority trust set 212. In either event, the instructions further cause the device to distribute 316 the certificate authority trust set 212 to the clients 102. In this manner, the example first method 300 causes the device to advise clients 102 of the certificate authority trust levels 210 of the various certificate authorities 108 in accordance with the techniques presented herein, and so ends at 318.

Figure 4:
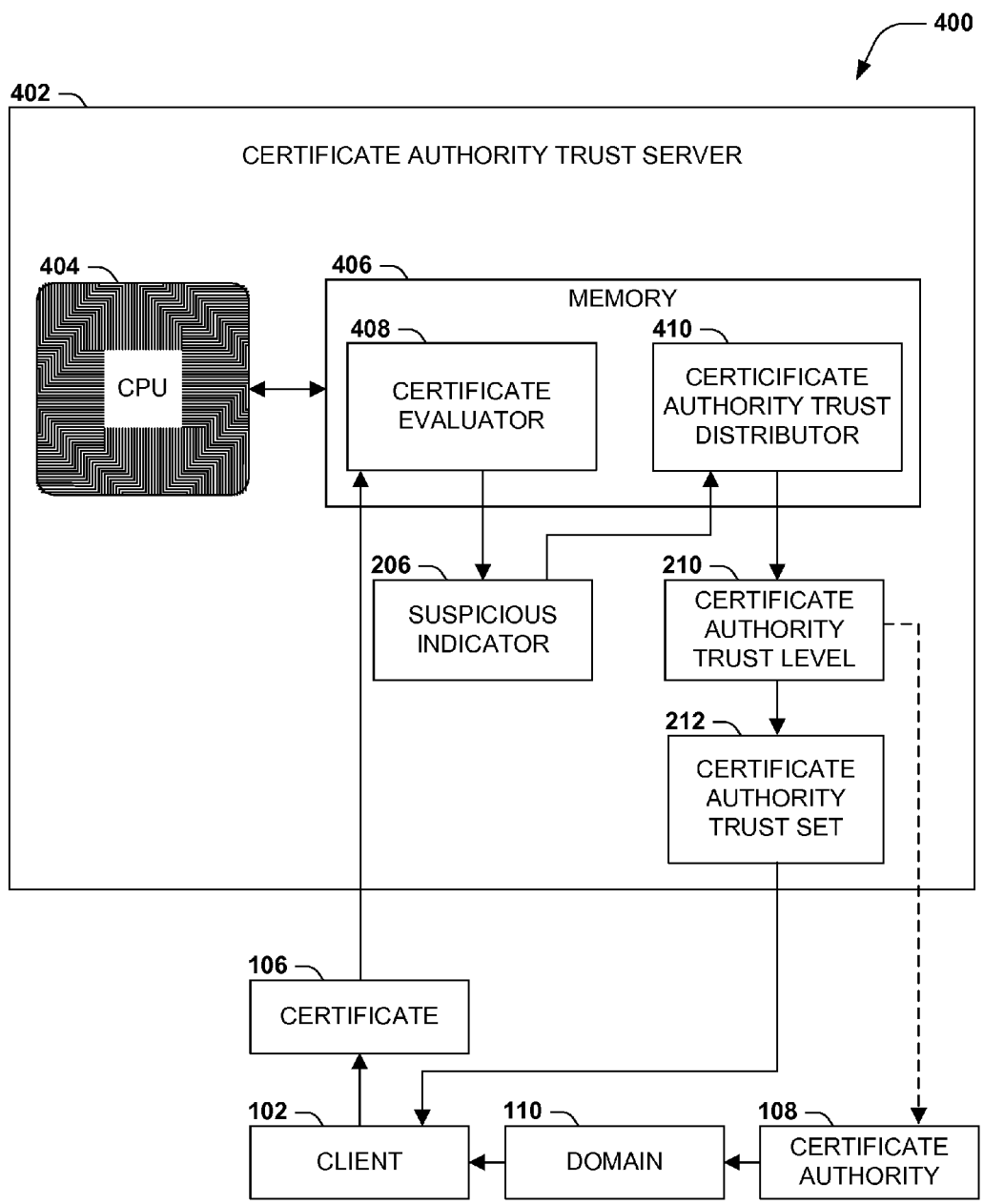
FIG. 4 is a component block diagram illustrating an example certificate authority trust server for advising clients of a certificate authority trust level of a certificate authority in accordance with the techniques presented herein.

FIG. 4 presents an illustration of an example second embodiment of the techniques presented herein, illustrated as an example certificate authority trust server 402 that advise clients 102 of a certificate authority trust level 210 of a certificate authority 108. The server comprises a processor 404, a certificate authority trust set 212, and a memory 406 storing instructions that, when executed on the processor 404, cause the certificate authority trust server 404 to operate according to the techniques presented herein. Alternatively (though not shown), one or more components of the example certificate authority trust server 402 may be implemented, e.g., as a volatile or nonvolatile logical circuit, such as a particularly designed semiconductor-on-a-chip (SoC) or a configuration of a field-programmable gate array (FPGA), that performs at least a portion of the techniques presented herein, such that the interoperation of the components completes the performance of a variant of the techniques presented herein.

In particular, the instructions stored in the memory device 406 and executed on the processor 404 provide a certificate evaluator 408, which, responsive to receiving a certificate 106 issued by a certificate authority 108 for a domain 110, evaluates the certificate 106 to detect a suspicious indicator 206 of the certificate 106. The certificate evaluator 408 also, responsive to detecting the suspicious indicator 206 of the certificate 106, reduces the certificate authority trust level 210 of the certificate authority 108 in the certificate authority trust set 212; and responsive to failing to detect the suspicious indicator 206 of the certificate 106, maintains the certificate authority trust level 210 of the certificate authority 108 in the certificate authority trust set 212, The instructions stored in the memory device 406 and executed on the processor 404 also provide a certificate authority trust distributor 410, which distributes the certificate authority trust set 212 to the clients 102. In this manner, the example certificate authority trust server 402 advises the clients 102 regarding the certificate authority trust levels 210 of respective certificate authorities 108 sin accordance with the techniques presented herein.

Figure 5:
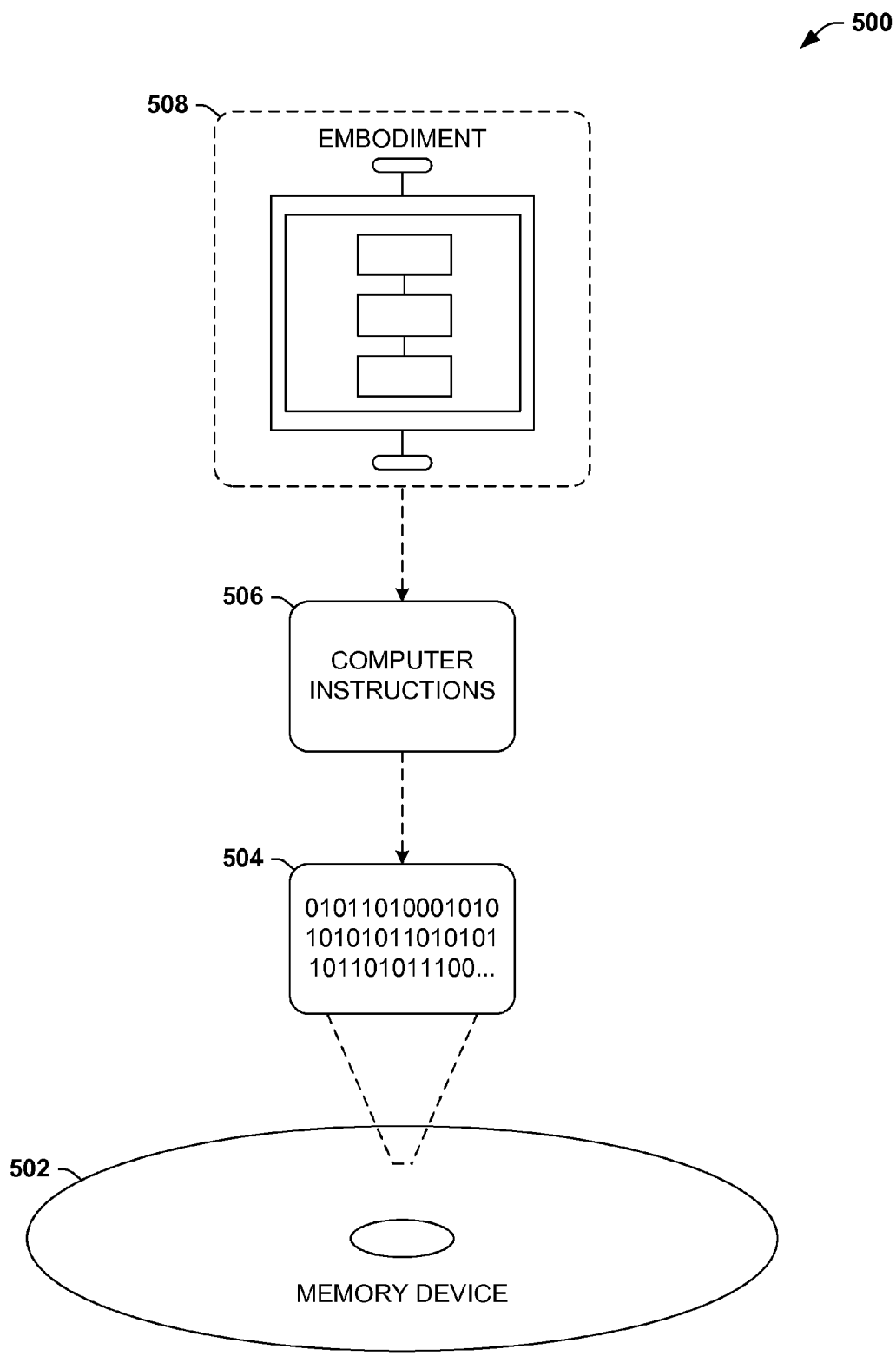
FIG. 5 is an illustration of an example memory device including processor-executable instructions configured to embody one or more of the provisions set forth herein.

FIG. 5 presents an illustration of an example scenario 500 featuring an example memory device 502 (e.g., a CD-R, DVD-R, or a platter of a hard disk drive), on which is encoded computer-readable data 504. The computer-readable data 504 in turn comprises a set of computer instructions 506 configured to operate according to the principles set forth herein. In one such embodiment, the processor-executable instructions 506 may be configured to implement method of advising clients 102 regarding the certificate authority trust levels 210 of respective certificate authorities 108, such as the example system 300 of FIG. 3. In another such embodiment, the processor-executable instructions 506 may be configured to implement a certificate authority trust server that advises clients 102 regarding the certificate authority trust levels 210 of respective certificate authorities 108, such as the example certificate authority trust server 402 of FIG. 4. Many such memory devices may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example first method 300 of FIG. 3; the example system 406 of FIG. 4; the example second method 500 of FIG. 5; and the example computer-readable storage device 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized with many types of clients 102, such as devices operated by one or more users; one or more applications executing on such devices; and/or online services provided on behalf of one or more users or other applications. The certificate authority trust service may also be provided in a variety of architectures, including a service performed on the device of the client 102 (e.g., a web browser security component); a local area network service deployed over a local area network of an organization on behalf of the clients 102 of the organization; or a wide-area network service deployed over a wide-area network, such as a service provided over the internet on behalf of a large number of clients 102. Such certificate authority trust services may also be implemented in a variety of architectures, including a large-scale server farm that is geographically grouped and/or geographically distributed, where respective servers of the service evaluate a subset of the certificates 106 received by the certificate authority trust service.

As a second variation of this first aspect, the techniques presented herein may be utilized to determine a certificate authority trust level 212 of a certificate authority 108, and involving various types of resources 104 presented to and/or accessed by a client 102, such as messages; applications; websites; and/or identifying credentials of one or more domains 110 of a network.

As a third variation of this first aspect, the techniques presented herein may be utilized to evaluate the determine a certificate authority trust level 212 of various types of certificate authorities 108 issuing certificates 106, such as the X.509 certification-based trust infrastructure.

As a fourth variation of this first aspect, many types of certificate authority trust services 202 may be provided to facilitate the evaluation by clients 102 of determine a certificate authority trust level 212 of various certificate authorities 108. Such certificate authority trust services 202 may comprise a public service provided to any client 102, or a semi-private or private service provided to a specific set of clients 102. Alternatively or additionally, a certificate authority trust service 202 may identify the certificate authority trust levels 210 of any certificate authority 108, or of only a subset of certificate authorities 108, such as those issuing particular types of certificates 106; those issuing certificates 106 only for a particular set of certificated items 104; or those interoperating on behalf of a particular set of domains 110 and/or clients 102.

As a fifth variation of this first aspect, one or more clients 102 may utilize the certificate authority trust set 212 in various ways. As a first such example, a client 102 may only permit access to resources 104 from domains 110 that are associated with a certificate 106 issued by a certificate authority 108 having a high certificate authority trust level 210 specified in the certificate authority trust set 212, and may restrict access to resources 104 form other domains 110. As a second such example, a client 102 may permit access to resources 110 associated with domains 110 that are certified by certificates 106 issued by certificate authorities 108 that are not associated with a high certificate authority trust level 210 according to the certificate authority trust set 212, but may do so only after warning a user of the certificate authority trust level 210 of the certificate authority 108, and/or may provide access within tightened security credentials (e.g., executing a first application certified by a first certificate 106 issued by a first certificate authority 108 having a high certificate authority trust level 210 natively and with a high level of privileges; and executing a second application certified by a second certificate 106 executed by a second certificate authority 108 having a low certificate authority trust level 210 with a restricted set of privileges, such as within an isolation construct, such as a virtual machine having limited access to the device of the user). These and other scenarios may be compatible with the application of the techniques presented herein.

E2. Receiving and Selected Certificates for Evaluation

A second aspect that may vary among embodiments of the techniques presented herein involves the manner of receiving certificates 106, and selecting among the received certificates 106 a subset of certificates 106 to be evaluated.

As a first variation of this second aspect, a certificate authority trust server 402 may evaluate certificates 106 received from a variety of sources that, in turn, received from a variety of domains 110 after issuance by a certificate authority 108. As a first such example, the source of a certificate 106 may comprise the client 102 upon which the certificate authority trust service is provided. As a second such example, the source of a certificate 106 may comprise an individual, such as a security researcher who believes that a particular certificate 106 may be untrustworthy. As a third such example, the source of a certificate may comprise a trusted domain crawler that explores an interconnected set of domains 110 and submits certificates 106 received from domains 110 during such exploration. As a fourth such example, the source of a certificate may comprise an untrusted source, such as a public individual or device, wherein the integrity of the certificate 106 may not be reliable (e.g., a third party may have altered a certificate 106 after receipt from a domain 110 in order to introduce a suspicious indicator 206 that may reduce the certificate authority trust level 210 of the certificate authority 108). As a fifth such example, the source of a certificate may comprise the domain 110 and/or certificate authority 108 associated with the certificate 106, which may submit the certificate 106 in order to verify the absence of suspicious indicators 206 and/or to request an analysis of a suspicious indicator 206 that has arisen within the certificate 106.

As a second variation of this second aspect, a certificate authority trust server 402 may be configured to evaluate all of the certificates 106 received by the server. Such certificates 106 may be evaluated in realtime or near-realtime, and/or may be stored upon receipt and evaluated at a later time. Such certificates 106 may also be evaluated in any desired order, such as chronological order of issuance; chronological order of receipt; and/or according to the certificate authority 108 and/or domain 110 of the certificate 106.

As a third variation of this second aspect, a certificate authority trust server 402 may be configured to evaluate only a subset of the certificates 106 received by the server. For example, the certificate authority trust server 402 may only be interested in evaluating certificates 106 from a particular domain 110 or set of domains 110, or only from a particular certificate authority 108 or set of certificate authorities 108.

As a first example of this third variation of this second aspect, the certificate evaluation 604 may be applied randomly, e.g., as a random spot-check of certificates 106.

As a second example of this third variation of this second aspect the certificate evaluation 604 may be applied only for a limited number of certificates 106 received from a certificate authority 108 over a period of time (e.g., only ten certificates 106 received each day from each certificate authority 108).

As a third example of this third variation of this second aspect respective domains 110 may be associated with a domain significance indicator that indicates the significance of the domain 110, which may in turn indicate the likelihood of a third party seeking to compromise the domain 110 and/or reduce the perceived trustworthiness of the domain 110 and its certificates 106, and/or the potential harm that may result from an undetected compromise of such devices. Such domain significance indicators may be selected from a domain significance indicator set including a security domain indicator that associates the domain 110 with the security of a resource 104 (e.g., a domain associated with a internet infrastructure server, or an industrial control system, such as a supervisory control and data acquisition (SCADA) server that controls and/or collects data about an industrial system or process); a ranking of a search engine; a commercial domain indicator that associates the domain 110 with a commercial enterprise (e.g., a domain involving a network router, mail server, business logic server, and/or database of a business or financial institution); and/or a political domain indicator that associates the domain 110 with a political organization (e.g., a domain controlled by a government agency). Due to the significance and/or sensitivity of such domains 110, a certificate authority trust service may selectively evaluate the certificates 106 received from and associated with such domains 110 and/or the certificate authorities 108 that issue certificates 106 on behalf of such domains 110, while forgoing and/or de-prioritizing the evaluation of certificates 106 associated with other domains 110.

Figure 6:
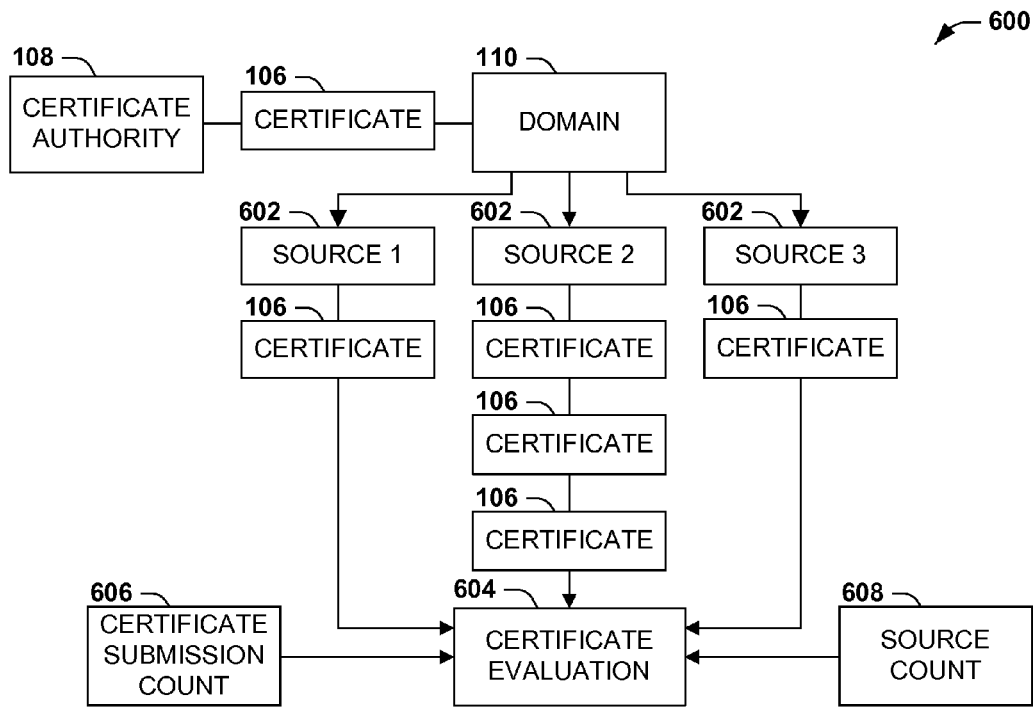
FIG. 6 is an illustration of an example scenario featuring a certificate evaluation of certificates based on a certificate submission count and a source count in accordance with the techniques presented herein.

FIG. 6 is an illustration of an example scenario 600 involving further examples of this third variation of this second aspect, wherein a certificate evaluation 604 is selectively applied to certificates 106 received from sources 602. In this example scenario 600, a certificate authority 108 issues a certificate 106 to a domain 110, which in turn presents the certificate 106 to a variety of sources 602. Rather than evaluating the certificate 106 upon first receipt from a source 602, a certificate authority trust service may apply the certificate evaluation 604 only after receiving the certificate 106 a number of times. For example, responsive to receiving the certificate 106 from a source 602, the certificate authority trust service may increment a certificate submission count for the certificate 106, and may apply the certificate evaluation 604 to the certificate 106 only responsive to incrementing the certificate submission count of the certificate 106 above a certificate submission threshold (e.g., only once the certificate 106 has been received ten times, or only if the certificate 106 has been received at least ten times over the span of an hour). This evaluation may reduce the evaluation of certificates 106 that are uniquely or only rarely encountered by clients, and/or may apply the certificate evaluation 604 only to certificates 106 that exhibit a positive trend in the frequency with which sources 602 receive the certificate 106 from a domain 110. Alternatively or additionally, responsive to receiving the certificate 106 from a source 602 that received the certificate 106 from the domain 110, the certificate authority trust service may increment a source count for the certificate 106 (e.g., noting the number of different sources 602 that have submitted the certificate 106 to the certificate authority trust service), the certificate evaluation 604 may be performed only responsive to incrementing the source count of the certificate 106 above a source count threshold (e.g., only once ten different sources 602 have submitted the certificate 106 to the certificate authority trust service, which may reduce the potential for a small group of third parties to submit an altered certificate 106 for certificate evaluation 604 that may unfairly reduce the certificate authority trust level 210 of the certificate authority 108). Many such variations in the receipt and selection of certificates 106 for evaluation by the certificate authority trust service may be included in embodiments of the techniques presented herein.

E3. Certificate Evaluation

A third aspect that may vary among embodiments of the techniques presented herein involves the manner of identifying suspicious indicators 206 in a certificate 106 issued by an certificate authority 108 for a domain 110.

Figure 7:
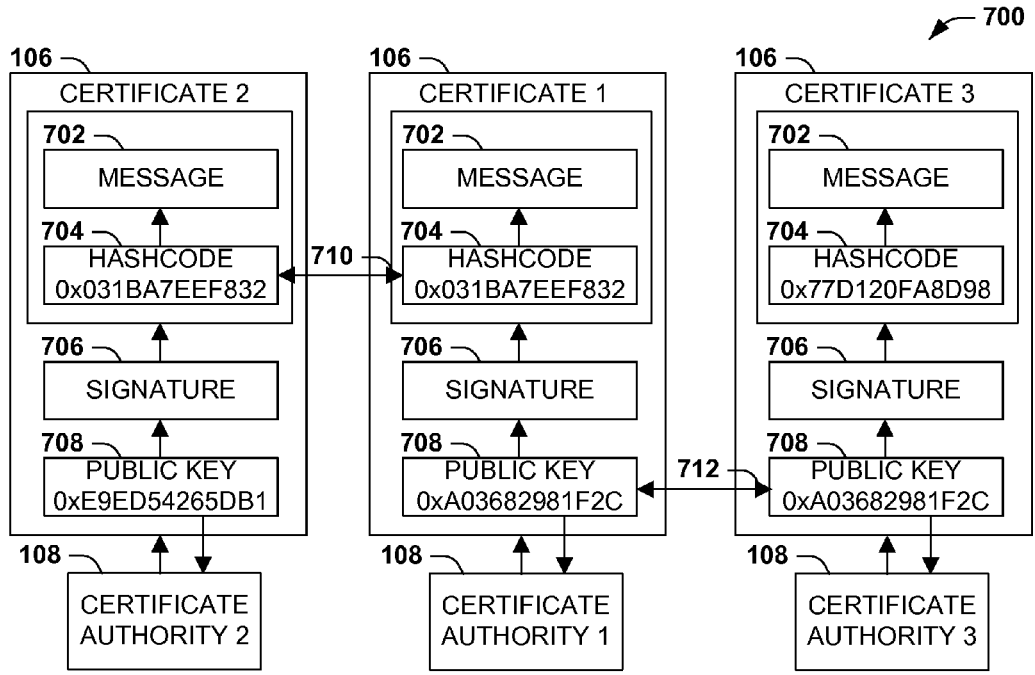
FIG. 7 is an illustration of an example scenario featuring the detection of some suspicious indicators of certificates, such as hashcode collisions and public key re-use, in accordance with the techniques presented herein.

FIG. 7 presents an illustration of an example scenario 700 featuring two such variations this third aspect. In this example scenario 700, a first certificate 106 is received that has been issued for a domain 110 by a first certificate authority 108 that includes a message 702 identified by a hashcode 704, and also a signature 706 that is verifiable by a public key 708 that is associated with the first certificate authority 108. An examination of the first certificate 106 in isolation may not reveal any suspicious indicators 206 that diminish the trustworthiness of the first certificate 106, the first certificate authority 108, and/or the domain 110. However, a comparison of the first certificate 106 with other certificates 106 may reveal suspicious indicators 206 of the first certificate 106.

As a first variation of this third aspect presented in the example scenario 700 of FIG. 7, a second certificate 106 may have been issued by a second certificate authority 108, and may comprises a second hashcode 704 of a second message 702. A match 710 between the first hashcode 704 of the first certificate 106 and the second hashcode 704 of the second certificate 106 may comprise a suspicious indicator 206; e.g., the first message 702 of the first certificate 106 may have been altered to result in a matching hashcode 704, which may enable a re-use of some credentials applied by the second certificate authority 108 to the second certificate 106.

As a second variation of this third aspect presented in the example scenario 700 of FIG. 7, the public key 708 included in the first certificate 106 to verify the first signature 704 may match 712 a public key 708 included in third certificate 106 by a third certificate authority 108 to verify a third signature 706 of the third certificate 106, which may enable the first certificate authority 108 to re-use the signature 706 of the third certificate 106 to imply that the first certificate 106 was signed by the third certificate authority 108. The match 712 may be detected and interpreted as a suspicious indicator 206 of the first certificate 106 in accordance with the techniques presented herein.

Figure 8:
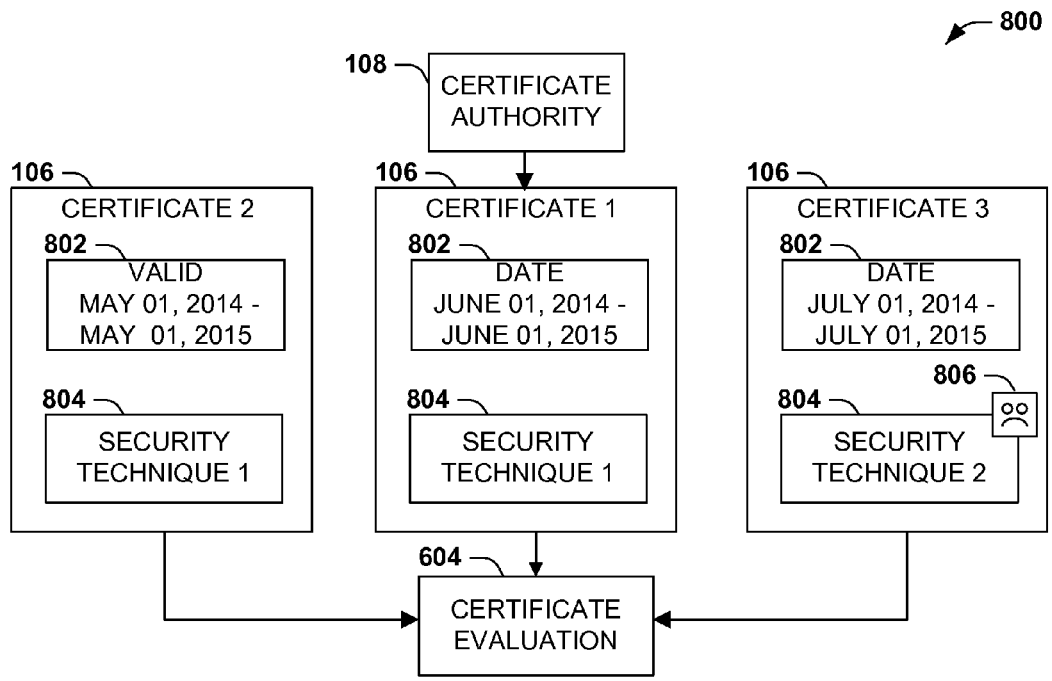
FIG. 8 is an illustration of an example scenario featuring an evaluation of certificate authorities according to the security practices utilized thereby in the generation of certificates in accordance with the techniques presented herein.

FIG. 8 presents an illustration of an example scenario 800 featuring two additional variations of this third aspect. In this example scenario 800, a certificate authority 108 may issue a set of certificates 106 for a domain 110. A certificate evaluation 604 of each certificate 106 in isolation may not reveal any suspicious indicators 206 that diminish the trustworthiness of the first certificate 106, the first certificate authority 108, and/or the domain 110. However, a comparison of the respective certificates 106 may reveal suspicious indicators 206 included therein.

As a third variation of this third aspect presented in the example scenario 800 of FIG. 8, a first certificate 106 may have been issued by the certificate authority 108 with a first certificate duration 802, such as a first date range, and using a security technique 804 (e.g., a particular hashing algorithm used to generate a hashcode of the certificate 106). In isolation, the certificate duration 802 may not present a suspicious indicator 206; but by comparison with a second, previous certificate 106 may have been issued by the certificate authority 108 and using the same security techniques 804, and with a certificate duration 802 that is within the certificate duration 802 of the first certificate 106. The previous certificate 106 may therefore be equivalent to the first certificate 106, and it may not be clear why the certificate authority 108 has issued the first certificate 106 while only a small portion of the certificate duration 802 of the previous certificate 106 has elapsed.

As a fourth variation of this third aspect presented in the example scenario 800 of FIG. 8, a certificate 106 for a domain 110 may have been issued by a certificate authority 108 at a first time, and a previous certificate 106 for the domain 110 may have been previously issued by a second certificate authority 110 at a second time. A comparison of a time interval between the first time and the second time with a time interval threshold (e.g., an indication that the certificate authorities 108 issuing certificates 106 for the domain 110 has changed rapidly over a brief interval) may be construed as a suspicious indicator 206 of the certificate 106.

As a fifth variation of this third aspect presented in the example scenario 800 of FIG. 8, the first certificate 106 may have been issued with a first security technique 804 that presents a particular security assurance (e.g., a perceived and/or tested reliability of the security technique 804 against security vulnerabilities, such as susceptibility to hashcode collisions). However, subsequent to the first certificate 106, a third certificate 106 may have been issued that utilizes a second security technique 804 having a lower security assurance than the first security technique 804 of the first certificate 106. For example, if the first certificate 106 is issued with 256-bit encryption, the issuance of a third certificate 106 subsequent to the first certificate 106 and issued with 64-bit encryption, which is much more easily decoded through brute-force trial-and-error, may represent a suspicious indicator 206 of the third certificate 206. The detection of an unexplained reduction in the assurance provided by the security techniques 804 of the certificate authority 108 may be interpreted as a suspicious indicator 206 of the certificates 106 in accordance with the techniques presented herein.

As a sixth variation of this third aspect, a domain 110 may be associated with a domain region that is serviced by at least one regional certificate authority, while the certificate authority 108 issuing a certificate 106 for the domain 110 may be associated with a certificate authority region that is different from the domain region of the domain 110. A determination that the certificate authority region of the certificate authority 108 issuing a certificate 106 for the domain 110 does not match the domain region of the domain 110 may be construed as a suspicious indicator 206 of the certificate 106. For example, a government-controlled domain in a first nation may be expected to utilize an official, government-controlled certificate authority 108 to certify the government-controlled domain 110, and the issuance of a certificate 106 by a second certificate authority 108 controlled by a different and potentially adverse nation may be construed as a suspicious indicator 206 of the certificate 106.

As a seventh variation of this third aspect, a certificate authority trust service may store a certificate count of certificates 106 issued for the respective domains 110 by a certificate authority 108 over a time period, and may construe a determination that the certificate count for the domain 110 over the time period exceeds a certificate count threshold as a suspicious indicator 206 of the certificates 106 (e.g., determining that the certificate authority 108 has issued a large number of certificates for the domain 110 over a comparatively short period of time). These and other suspicious indicators 206 of certificates 106 issued by certificate authorities 108 for domains 110 may be detected by a certificate authority trust service provided in accordance with the techniques presented herein.

E4. Responses to Detection of Suspicious Indicators in Certificates

A fourth aspect that may vary among embodiments of the techniques presented herein involves the response of a certificate authority trust service to the detection of a suspicious indicator 206 of a certificate 106 issued by a certificate authority 108 for a domain 110.

As a first variation of this fourth aspect, the certificate authority trust service may include a new certificate authority evaluator that, upon receiving a certificate 106 from a new certificate authority 108 for which certificates 106 have not previously been received and/or evaluated, establishes a certificate authority trust level 210 in the certificate authority trust set 212 for the new certificate authority 108. As one such example, the new certificate authority evaluator may initially establish an untrusted certificate authority trust level 210 for the new certificate authority 108 (e.g., indicating that insufficient information has been evaluated for the certificate authority 108 to associate any degree of trustworthiness with the new certificate authority 108); and responsive to failing to detect a suspicious indicator 206 for a set of certificates 106 issued by the new certificate authority 108 (e.g., the issuance of legitimate and non-suspicious certificates 106 for an extended period of time), the new certificate authority evaluator may raise the certificate authority trust level 210 of the new certificate authority 108 in the certificate authority trust set 212.

As a second variation of this fourth aspect, the certificate authority trust service may include a domain notifier that, upon receiving a certificate 106 for a domain 110 that has not previously been evaluated, notifies the domain 110 and/or the certificate authority 108 of the certificate 106 issued for the domain 110 by the certificate authority 108. Alternatively, upon receiving a certificate 106 for a domain 110 that has been issued by a certificate authority 108 that has not previously issued certificates 106 for the domain 110, the certificate authority trust service may notify the domain 110 and/or the certificate authority 108 of the certificate 106 issued for the domain 110 by the certificate authority 108.

Figure 9:
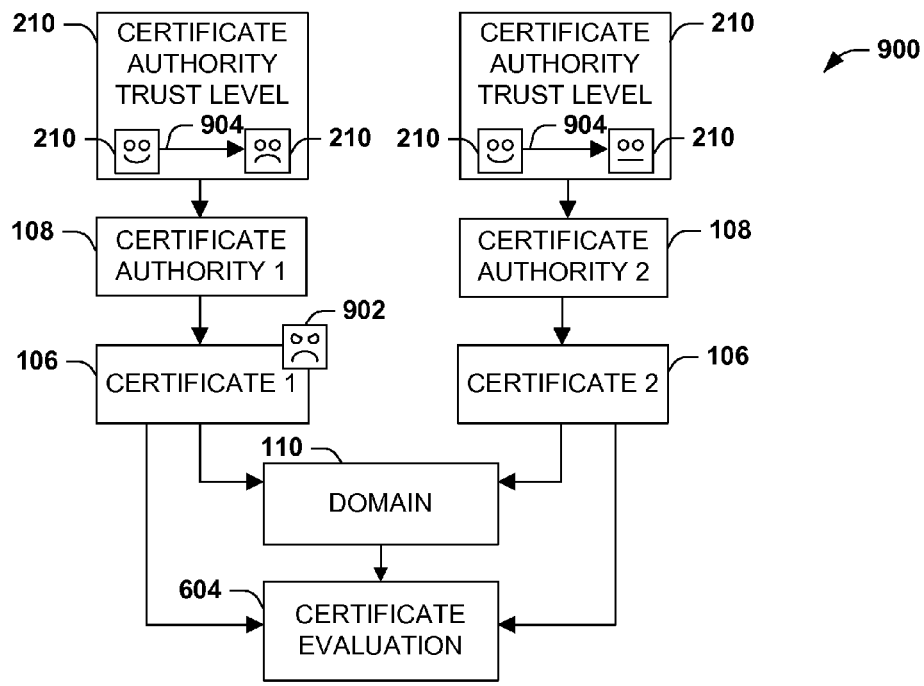
FIG. 9 is an illustration of an example scenario featuring an adjustment of the certificate authority trust levels of certificate authorities issuing certificates for a particular domain in accordance with the techniques presented herein.

FIG. 9 presents an illustration of an example scenario 900 featuring two further variations this fourth aspect. In this example scenario 900, a first certificate authority 108 issues a first certificate 106 for a domain 110, and a second certificate authority 108 issues a second certificate 106 for the same domain 110. However, a certificate evaluation 604 reveals an alteration 902 of the first certificate 106, suggesting that the certificate authority trust level 210 of the first certificate authority has been compromised. The certificate authority trust service may therefore reduce 904 the certificate authority trust level 210 of the first certificate authority 108 to an untrusted certificate authority trust level (e.g., promptly reducing the trust level of the first certificate authority 108 to zero, rather than an incremental reduction). The certificate authority trust service may also notify the certificate authority 108 of the alteration 902 of the first certificate 106, in order to enable an administrator of the first certificate authority 108 to respond to the compromising of the first certificate authority 108. Additionally, in case the domain 110 is involved in the compromising of the first certificate authority 108, the certificate authority trust service may identify the second certificate authority 108 that has issued a second certificate 106 for the same domain 110, and may adjust 904 the certificate authority trust level 210 of the second certificate authority 108 according to the first certificate authority trust level 210 of the first certificate authority 108 (e.g., modestly reducing the trust level of the second certificate authority 108 due to the association of the second certificate authority 108 with the same domain 110). In these and other ways, the certificate authority trust service may respond to the detection of suspicious indicators 206 during the certificate evaluation 604 in accordance with the techniques presented herein.

F. Computing Environment

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

Figure 10:
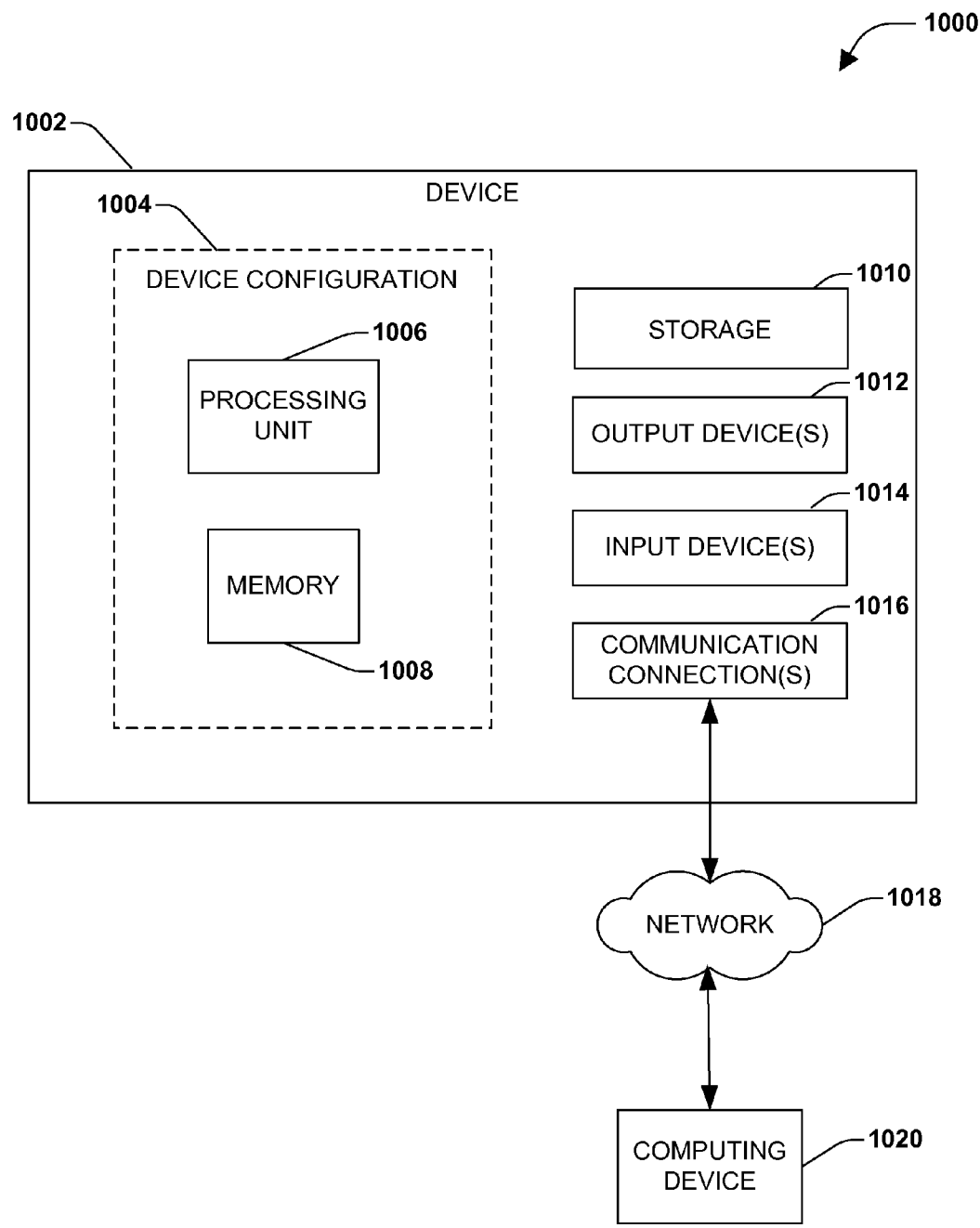
FIG. 10 is an illustration of an example computing environment wherein a portion of the present techniques may be implemented and/or utilized.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer-readable instructions" being executed by one or more computing devices. Computer-readable instructions may be distributed via computer-readable media (discussed below). Computer-readable instructions may be implemented as program modules, such as functions, objects, Application Programming Interfaces (APIs), data structures, and the like, that perform particular tasks or implement particular abstract data types. Typically, the functionality of the computer-readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer-readable instructions to implement one or more embodiments provided herein may be in storage 1010. Storage 1010 may also store other computer-readable instructions to implement an operating system, an application program, and the like. Computer-readable instructions may be loaded in memory 1008 for execution by processing unit 1006, for example.

The term "computer-readable media" as used herein includes memory devices that, as a class of technology, categorically excludes electromagnetic signals and non-statutory embodiments. Such memory devices may be volatile and/or nonvolatile, removable and/or non-removable, and may involve various types of physical devices storing computer-readable instructions or other data. Examples of such memory devices include RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer-readable media" also includes communication media, as a distinct and mutually exclusive category of computer-readable media than memory devices. Communication media typically embodies computer-readable instructions or other data in a "modulated data signal" such as a carrier wave or other transport mechanism and includes any information delivery media. The term "modulated data signal" may include an electromagnetic signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer-readable instructions may be distributed across a network. For example, a computing device 1020 accessible via network 1018 may store computer-readable instructions to implement one or more embodiments provided herein. Computing device 1002 may access computing device 1020 and download a part or all of the computer-readable instructions for execution. Alternatively, computing device 1002 may download pieces of the computer-readable instructions, as needed, or some instructions may be executed at computing device 1002 and some at computing device 1020.

G. Use of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer-readable instructions stored on one or more computer-readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not to be construed as advantageous over other aspects or designs. Rather, use of the word "example" is intended to present one of several feasible variations, scenarios, or embodiments of a particular concept.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of advising client devices of a certificate authority trust level of a certificate authority on a server device having a processor on behalf of a client set, the method comprising:
   executing on the processor instructions that cause the server device to:
      receive, from a first client device of the client set, a certificate issued by the certificate authority for a domain accessed by the first client device and transmitted by the domain to the first client device to authenticate a resource of the domain to the first client device, and forwarded by the first client device to the server device;
      based at least on evaluating the certificate and detecting a suspicious indicator of the certificate, reduce the certificate authority trust level of the certificate authority in a certificate authority trust set;
      based at least on failing to detect the suspicious indicator of the certificate, maintain the certificate authority trust level of the certificate authority in the certificate authority trust set; and
      distribute the certificate authority trust set to the client set including the first client device and a second client device.

2. The method of claim 1, wherein:
   the certificate comprises a first hashcode of a first data element of the certificate;
   a second certificate issued by a second certificate authority comprises a second hashcode of a second data element of the second certificate; and
   detecting the suspicious indicator further comprises:
      detecting a match between the first hashcode of the certificate and the second hashcode of the second certificate.

3. The method of claim 1, wherein:
the certificate comprises a first data element generated by the certificate authority and verifiable by a first public key associated with the certificate authority;
a second certificate issued by a second certificate authority comprises a second data element generated by the second certificate authority and verifiable by a second public key associated with the second certificate authority; and
detecting the suspicious indicator further comprises: detecting a match between the first public key associated with the certificate authority and the second public key associated with the second certificate authority.

4. The method of claim 1, wherein:
the certificate is generated by the certificate authority using a first security technique;
a previous certificate that was previously generated by the certificate authority using a second security technique; and
detecting the suspicious indicator further comprises: determining that the first security technique used to generate the certificate presents a lower security assurance than the second security technique used to generate the previous certificate.

5. The method of claim 1, wherein:
the domain is associated with a domain region that is serviced by at least one regional certificate authority;
the certificate authority is associated with a certificate authority region; and
detecting the suspicious indicator further comprises: detecting that the certificate authority region of the certificate authority does not match the domain region of the domain.

6. The method of claim 1, wherein:
a previous certificate was previously issued by the certificate authority for the domain for a certificate duration; and
detecting the suspicious indicator further comprises:
detecting that the certificate for the domain is equivalent to the previous certificate for the domain; and
detecting that the certificate for the domain was issued during the certificate duration of the previous certificate for the domain.

7. The method of claim 1, wherein:
the certificate for the domain was issued by the certificate authority at a first time;
a previous certificate for the domain was previously issued by a second certificate authority at a second time; and
detecting the suspicious indicator further comprises: comparing a time interval between the first time and the second time with a time interval threshold.

8. The method of claim 1, wherein:
executing the instructions further causes the server device to store a certificate count of certificates issued for the domain by the certificate authority over a time period; and
detecting the suspicious indicator further comprises: determining that the certificate count for the domain over the time period that exceeds a certificate count threshold.

9. A memory device storing instructions that, when executed on a processor of a server having a certificate authority trust set, cause the server to advise a client set, comprising a first client device and a second client device, of certificate authority trust levels of certificate authorities, by:

receiving, from the first client device, a certificate issued by a certificate authority for a domain and transmitted by the domain to the first client device to authenticate a resource of the domain to the first client device, and forwarded by the first client device to the server;
based at least on evaluating the certificate and detecting a suspicious indicator of the certificate, reducing a certificate authority trust level of the certificate authority in the certificate authority trust set;
based at least on failing to detect the suspicious indicator of the certificate, maintaining the certificate authority trust level of the certificate authority in the certificate authority trust set; and
distributing the certificate authority trust set to the client set including the first client device and the second client device.

10. The memory device of claim 9, wherein:
executing the instructions further causes the server to, upon receiving the certificate from a source that received the certificate from the domain, increment a certificate submission count for the certificate; and
evaluating the certificate further comprises: only responsive to incrementing the certificate submission count of the certificate above a certificate submission threshold, evaluating the certificate to detect a suspicious indicator of the certificate.

11. The memory device of claim 9, wherein:
executing the instructions further causes the server to, upon receiving the certificate from a source that received the certificate from the domain, increment a source count for the certificate; and
evaluating the certificate further comprises: only responsive to incrementing the source count of the certificate above a source count threshold, evaluating the certificate to detect a suspicious indicator of the certificate.

12. The memory device of claim 9, wherein evaluating the certificate further comprises:
determining whether the domain is associated with a domain significance indicator; and
only responsive to determining that the domain is associated with the domain significance indicator, evaluating the certificate to detect a suspicious indicator of the certificate.

13. The memory device of claim 12, wherein the domain significance indicator is selected from a domain significance indicator set comprising:
a security domain indicator that associates the domain with security of a resource;
a ranking of a search engine;
a commercial domain indicator that associates the domain with a commercial enterprise; and
a political domain indicator that associates the domain with a political organization.

14. A server that advises a client set, comprising a first client device and a second client device, of certificate authority trust levels of certificate authorities, the server comprising:
a processor;
a memory storing a system comprising:
a certificate authority trust set identifying, for respective certificate authorities, a certificate authority trust level for the certificate authority;
a certificate evaluator that:
receives, from the first client device, a certificate issued by a selected certificate authority for a domain and transmitted by the domain to the first client device to authenticate a resource of the domain to the first client device, and forwarded by the first client device to the server;

based at least on evaluating the certificate and detecting a suspicious indicator of the certificate, reduces a certificate authority trust level of the selected certificate authority in the certificate authority trust set;

based at least on failing to detect the suspicious indicator of the certificate, maintains the certificate authority trust level of the selected certificate authority in the certificate authority trust set; and a certificate authority trust distributor that distributes the certificate authority trust set to the client set including the first client device and the second client device.

15. The server of claim 14, wherein the memory further stores: a new certificate authority evaluator that, upon receiving the certificate from a new certificate authority for which a previous certificate has not been received, establish a certificate authority trust level in the certificate authority trust set for the new certificate authority.

16. The server of claim 15, wherein:
the new certificate authority evaluator initially establishes an untrusted certificate authority trust level for the new certificate authority; and
the certificate evaluator, based at least on failing to detect a suspicious indicator for a set of certificates issued by the new certificate authority, raises the certificate authority trust level of the new certificate authority in the certificate authority trust set.

17. The server of claim 14, wherein the memory further stores: a domain notifier that, based at least on determining that the certificate received from the selected certificate authority is for a domain that has not previously been evaluated, notifies the domain of the certificate issued for the domain by the selected certificate authority.

18. The server of claim 14, wherein:
the certificate authority trust set identifies a second certificate authority level for a second certificate authority that has issued a second certificate for the domain; and
the certificate evaluator further adjusts the certificate authority trust level of the selected certificate authority according to the second certificate authority trust level of the second certificate authority.

19. The server of claim 14, wherein:
the certificate evaluator further detects the suspicious indicator by detecting an alteration of the certificate after issuance for the domain by the selected certificate authority; and
the certificate evaluator further reduces the certificate authority trust level by, based at least on detecting the alteration of the certificate, reducing the certificate authority trust level of the selected certificate authority to an untrusted certificate authority trust level.

20. The server of claim 14, wherein the certification evaluator, based at least on detecting the alteration of the certificate, notifies the selected certificate authority of the alteration of the certificate.

\* \* \* \* \*